United States Patent [19]
Chakraborty

[11] Patent Number: 5,499,279
[45] Date of Patent: Mar. 12, 1996

[54] APPARATUS FOR REMOVING FREE HYDROGEN FROM A GAS MIXTURE CONTAINING HYDROGEN AND OXYGEN

[75] Inventor: Amiya K. Chakraborty, Erftstadt, Germany

[73] Assignee: Gesellschaft fur Anlagen- und Reaktorsicherheit, Cologne, Germany

[21] Appl. No.: 349,616

[22] Filed: Dec. 5, 1994

[30] Foreign Application Priority Data

Dec. 13, 1993 [EP] European Pat. Off. .............. 93120086

[51] Int. Cl.[6] .................................................. G21C 9/00
[52] U.S. Cl. ...................... 376/301; 423/580.1; 420/900
[58] Field of Search .................................. 376/301, 300; 423/580.1, 580.2; 502/326, 353; 420/900

[56] References Cited

U.S. PATENT DOCUMENTS

| | | | |
|---|---|---|---|
| 4,407,774 | 10/1983 | Schretzmann et al. | 376/301 |
| 4,755,359 | 7/1988 | Klatt et al. | 376/314 |
| 4,911,879 | 3/1990 | Heck et al. | 376/301 |
| 4,992,407 | 2/1991 | Chakraborty et al. | 376/301 |
| 4,996,033 | 2/1991 | Gardner-Chavis et al. | 423/580.2 |
| 5,130,079 | 7/1992 | Chakraborty | 376/301 |
| 5,167,908 | 12/1992 | Chakraborty | 376/301 |
| 5,271,906 | 12/1993 | Yuuki et al. | 422/177 |

FOREIGN PATENT DOCUMENTS

| | | |
|---|---|---|
| 303144 | 2/1989 | European Pat. Off. . |
| 0358912 | 3/1990 | European Pat. Off. . |
| 0416143 | 3/1991 | European Pat. Off. . |
| 0436942 | 7/1991 | European Pat. Off. . |
| 3725290 | 2/1989 | Germany . |
| 4236271 | 4/1993 | Germany . |
| 63-072851 | 4/1988 | Japan . |

OTHER PUBLICATIONS

Sandrock, "Metal Hydride Technology Fundamentals and Applications," Annual Colloquium of Univ. of Stuttgard, May 1991, pp. 143–169.

Maeland et al, "Hydride Formation Rates of B.C.C. Group V Metals", J. of Less–Common Metals, Apr. 1984, pp. 133–139.

*Primary Examiner*—Daniel D. Wasil
*Attorney, Agent, or Firm*—Thomas A. Gallagher; David N. Lathrop

[57] ABSTRACT

An apparatus for removing free hydrogen from a gas mixture containing essentially hydrogen, oxygen, and steam using a catalyst arrangement for catalytically supported oxidation of hydrogen and a hydrogen-storage apparatus for absorption of hydrogen by hydride formation. The catalyst arrangement and the hydrogen-storage apparatus are designed to operate in different temperature and pressure regions, and they are arranged to provide good heat conduction between them. In this manner, heat generated by hydride formation enhances catalytic oxidation.

16 Claims, 3 Drawing Sheets

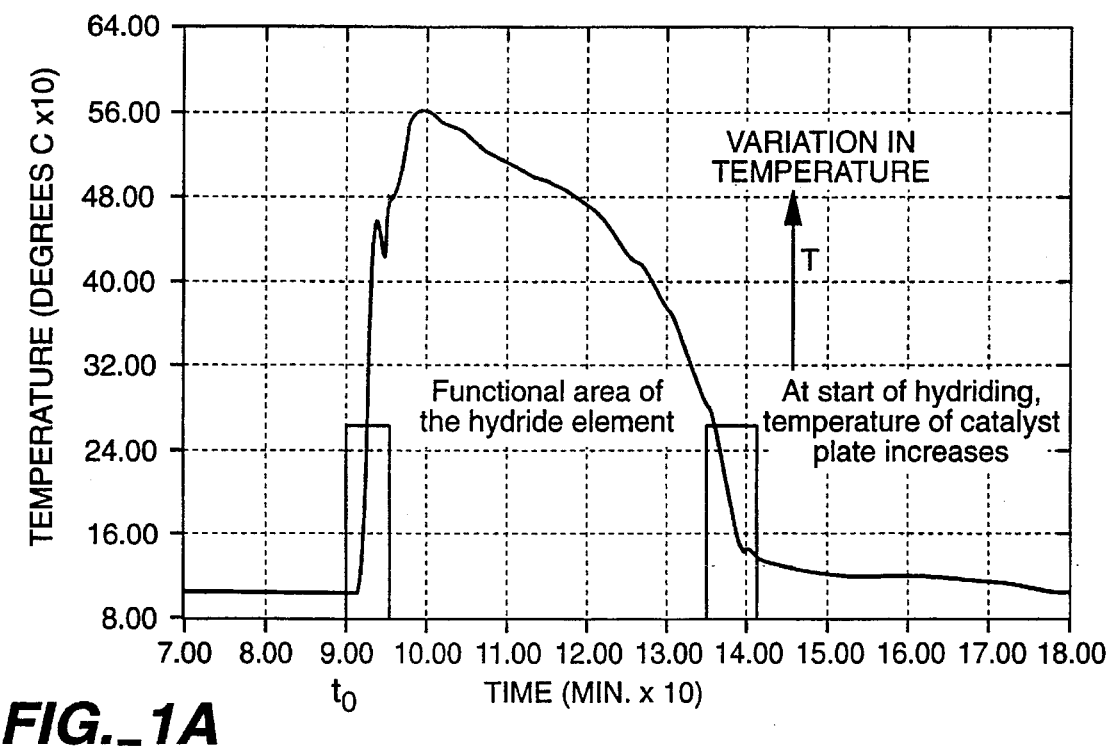
FIG._1A
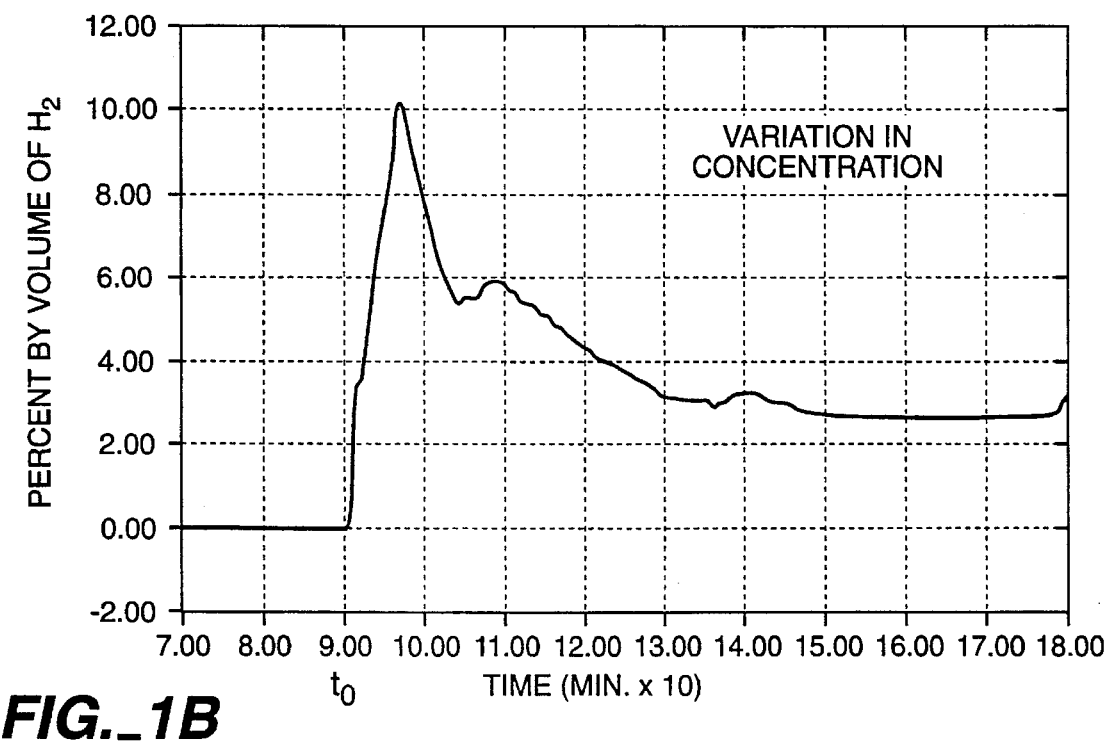
FIG._1B

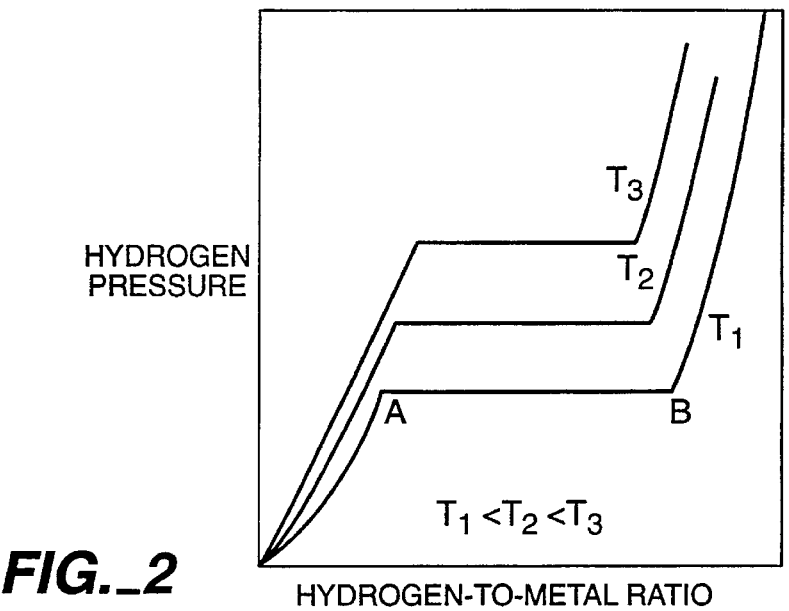
FIG._2
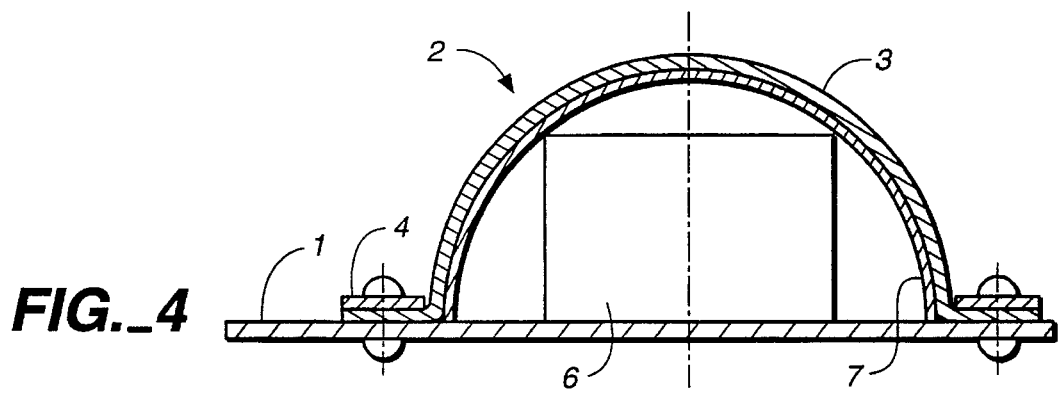
FIG._4
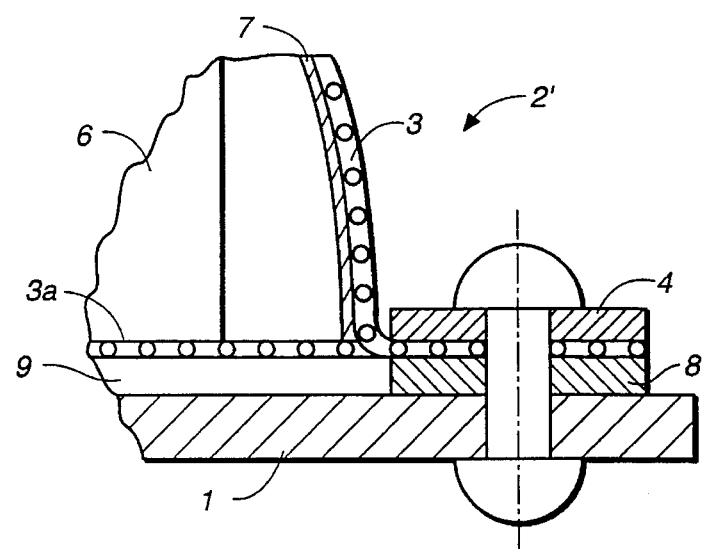
FIG._5

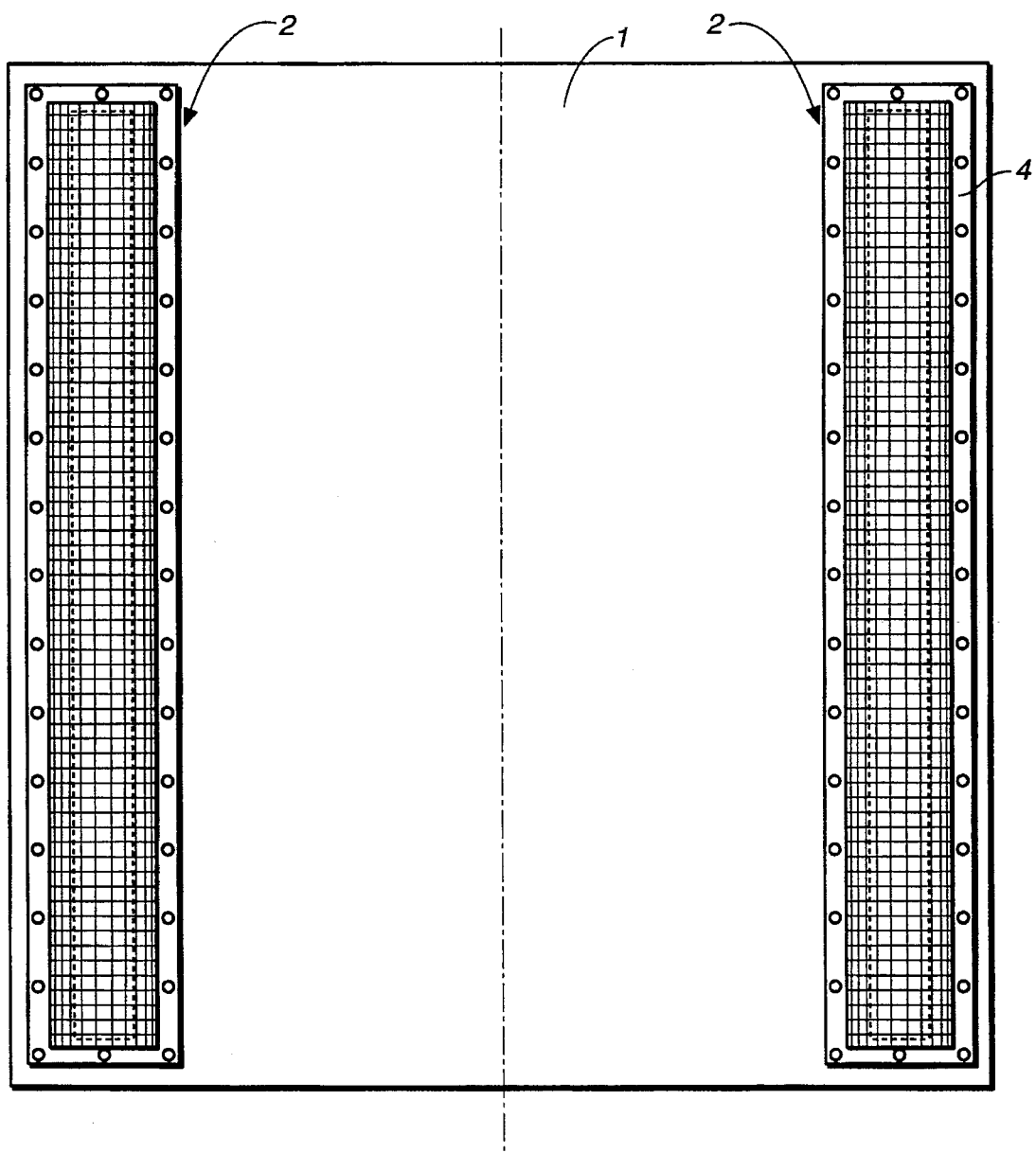
FIG._3A
FIG._3B

1

APPARATUS FOR REMOVING FREE HYDROGEN FROM A GAS MIXTURE CONTAINING HYDROGEN AND OXYGEN

TECHNICAL FIELD

The invention concerns an apparatus for the removal of free hydrogen from a gas mixture containing essentially hydrogen, oxygen, and steam.

BACKGROUND ART

As a serious accident in a nuclear power plant develops, various different chemical processes lead to the generation of hydrogen. Because of this, combustible gas mixtures can form within the reactor containment. A release and build-up of hydrogen over a relatively long period can lead to explosive mixtures. This means an increased danger to the integrity of the reactor containment, the last barrier for retaining fission products. (Here the term "reactor containment" is used as the general term for all spaces in which the problem described can arise and must be solved.) Such gas mixtures can also appear in heavy-water moderated reactors. Furthermore, in the intermediate storage and final storage of spent fuel rods, hydrogen and its isotopes are also released into an oxygen-containing atmosphere and represent a certain hazard potential.

In order to avoid the danger stemming from such an explosive gas mixture, measures are known that are designed to remove the hydrogen in the gas mixture. These measures include the use of igniters as well as the catalytic recombination of hydrogen with the oxygen simultaneously present in the gas mixture so as to form water. (See, for example, published patent application EP-A-0 303 144). A particularly promising use seems to be that of catalytic recombiners (catalysts) which have become familiar in various configurations (see, for example, EP-A-0 416 143, DE-A-36 04 416, EP-A-0 303 144, DE-A-40 03 833). Published patent application DE-A-37 25 290 discloses the suitability of ternary palladium alloys such as PdNiCu as a catalyst for the above-mentioned purposes. Such catalysts can be used in the form of carrier bodies coated with the catalyst alloy, or else in the form of a spongy material or as granules.

The amount of hydrogen oxidized per unit of time by catalytic action increases exponentially with the temperature of the catalyst. The catalysts heat up due to the exothermic reaction until they reach an equilibrium between the heat generated and the heat dissipated. Only upon reaching relatively high catalyst temperatures does the removal of the hydrogen accelerate, and only then does the convection caused by the increase in temperature lead to an intermixing of the surrounding atmosphere.

FIGS. 1a and 1b show the temperature variation and the hydrogen-concentration variation, respectively, in a reaction chamber that contains such a catalyst. The measurement results shown were obtained under the following conditions. The catalyst consisted of a carrier plate of austenitic steel with a surface area of 0.8 m$^2$ coated on both sides with a Pd alloy consisting of 95% by weight of Pd, 4% by weight of Ni, and 1% by weight of Cu. The spherical reaction chamber, with a volume of 10 m$^3$, was first heated in a steam atmosphere. After reaching a temperature of 100° C., the steam was pumped out of the reaction chamber and then 50% by volume of steam, 40% by volume of air, and 10% by volume of hydrogen were successively introduced.

As shown by the temperature variation pattern illustrated in FIG. 1a, the catalytic oxidation process commenced shortly after introduction of the hydrogen at time t0. Within about 7 minutes, the process caused the catalyst temperature to rise from 80° to 560° C. After reaching this maximum temperature of 560° C. and sustaining an increase in hydrogen-concentration of up to 10% by volume (see FIG. 1b), both the temperature and the hydrogen concentration started to decrease because of the accelerated catalytic oxidation of the hydrogen at the higher temperature. The figures also show that, after reaching a temperature of about 160° C. and a hydrogen concentration of about 2.8% by volume, no further decrease in the hydrogen concentration within the gas mixture could be perceived.

From the prior art are known so-called hydrogen-storage materials such as metals, metal alloys, or intermetallic compounds that can absorb hydrogen (and release it again) by means of a reversible process of hydride formation (see, for example, G. Sandrock, "Metal Hydride Technology Fundamentals and Applications," Energietraeger Wasserstoff [Hydrogen Energy Sources], 1991 *Annual Colloquium of the University of Stuttgart*, VDI-Verlag Duesseldorf, 1991, pages 143–170). Until now, such hydrogen-storage materials have been used primarily for storing hydrogen as an energy source. From published patent application JP-A-63-072851, an alloy of zirconium with titanium, niobium, molybdenum, iron and vanadium is known that can function as a hydrogen-absorbing alloy. This material is used as a heat reservoir or temperature sensor as well as for the storage, transporting, separation, and purification of hydrogen.

The object of the present invention is to design an apparatus of the type indicated at the beginning such that a more complete removal of the free hydrogen, especially at relatively low temperatures, is achieved.

SUMMARY OF INVENTION

This object is achieved by the invention as described herein and set forth in the claims.

Additional aspects of the invention are set forth in the dependent claims.

The invention is based on the recognition and utilization of the fact that the binding of hydrogen by hydride formation varies inversely, as a function of temperature and hydrogen partial pressure, with catalytic recombination.

The process of hydriding can be described on the basis of the idealized diagram shown in FIG. 2 which, with temperature as a parameter, shows the hydrogen pressure or hydrogen partial pressure against the ratio of hydrogen to the metal of a hydrogen-storage metal. With increasing pressure, a small amount of the hydrogen is absorbed by the metal to form a solid solution. From Point A to Point B considerable amounts of hydrogen are absorbed as hydride formation continues under a constant pressure, the so-called plateau pressure. This plateau corresponds to a two-phase mixture of a hydrogen-saturated metal phase and the hydride. At Point B, the metal has been converted completely to the hydride and a further increase in the hydrogen pressure causes a slight additional absorption of hydrogen into solution in the hydride phase.

As can be seen in FIG. 2, the plateau becomes higher and narrower with increasing temperature. This means that at low temperatures the hydrogen-storage metal absorbs larger amounts of hydrogen at a lower pressure.

If one now considers the atmospheric conditions and the temperatures in the reactor containment of a nuclear power plant in an accident situation, it turns out that the joint use of catalysts along with suitably chosen hydrogen-storage materials leads to an ideal synergistic arrangement:

1) If it is assumed that the surface area of the catalyst(s) is considerably larger than that of the hydrogen-storage material, then most of the $H_2$ molecules contained in the surrounding atmosphere will come into contact with the catalyst surface.

2) Given an initially large inflow and thus a high availability of $H_2$ molecules, the high hydrogen partial pressure will cause a rapid catalytic conversion and, in association with this, a rapid rise in temperature of the catalyst, as shown in FIG. 1a.

3) With an increasing temperature of the catalyst surface, its catalytic action increases so that a larger fraction of the impinging $H_2$ molecules has the activation energy required for the catalytic reaction.

4) Because of the exothermic reaction, the temperature of the catalyst surface continues to rise until a state of equilibrium is reached between the heat generated and the heat dissipated to the surroundings by thermal radiation and convection. The catalytic reaction at relatively high temperatures is one of the most efficient methods of $H_2$ removal; therefore, the predominant portion of the hydrogen is removed when the $H_2$ concentration of the gas mixture is relatively high.

5) After most of the hydrogen has been removed, the resulting fall in the hydrogen partial pressure diminishes the catalytic reaction which in turn diminishes the generation of heat, thereby decreasing the temperature of the catalyst.

6) The decreased temperature of the catalyst reduces the catalytic effect so that a smaller fraction of the hydrogen coming into contact with the catalyst surface is actually oxidized, which in a type of chain reaction accelerates the temperature drop.

7) As compared to the catalytic reaction just described, the hydriding of the hydrogen-storage material does not contribute significantly to the removal of hydrogen in the high hydrogen partial pressures and high temperatures of the original situation; however, if the hydrogen storage material is suitably chosen, the exothermic hydride formation can start to make a contribution when the catalytic reaction begins to decrease markedly. In accordance with the invention, the hydrogen-storage device is thermally coupled with the catalyst arrangement to facilitate the exchange of heat. The above-described chain reaction is slowed due to the flow of heat from the hydrogen-storage device to the catalyst arrangement. This hydride formation not only removes hydrogen on its own, but also causes the catalyst surface to remain at a higher temperature for a longer period of time, causing a larger catalytic action than would have occurred without this flow of heat from the hydrogen-storage device.

Comprehensive studies with the solid solutions of Nb-V alloys (see A. J. Maeland, G. G. Libowitz, F. J. Lynch, and G. Rak: *Journal of the Less-Common Metals*, 104 (1984), pages 133–139) have shown that some of these alloys react extremely rapidly with hydrogen at a low hydrogen partial pressure and at room temperature without requiring any kind of activation treatment. The measured reaction times at higher temperatures were a few powers of ten shorter than those of niobium alone. From studies with solid solutions of both niobium and also tantalum, it can be concluded that the reaction proceeds very rapidly when the additional metals in the solid solution have an atomic radius about 5% less than niobium and tantalum, respectively. A number of solid solutions have relatively large response times before hydride formation begins. Table 1 gives the composition of various alloys, the time up to the end of hydride formation, and the final ratio of hydrogen to metal. In many cases this ratio is greater than 0.8, which shows that these interstitial solid solutions have an enormous binding capacity for hydrogen. Thus, 100 g of such a solid solution can bind about 8.7 grams of hydrogen which is equivalent to about 97.2 liters of hydrogen at room temperature and normal pressure.

Also measured during the hydride formation were very large releases of heat in combination with spalling, an increase in the initial volume, and powdering.

In the apparatus proposed on the basis of the invention, the hydrogen-storage materials are selected in such a way that, in an initial stage immediately after a hydrogen release, the catalytic reaction is primarily responsible for the removal of hydrogen through oxidation. This ensures a rapid conversion of a large portion of the hydrogen to water. The chosen hydrogen-storage materials react only slightly at the resulting temperature imparted to the hydrogen-storage material by the intended heat exchange, so at this stage they do not exert an appreciable effect. The temperature rise in this initial stage occurs so rapidly that the region of relatively low temperatures is traversed within a period of time that, depending on the selected hydrogen-storage material, can be shorter than the hydrogen-storage material response time. When the catalytic reaction subsides and both the temperature and the hydrogen partial pressure drop, then hydriding by the hydrogen-storage material commences and the heat of reaction counteracts a further decrease in catalytic action. The hydriding process may even increase catalytic recombination temporarily. FIG. 1a illustrates the temperature regions within which hydriding occurs for an alloy consisting of 80% by weight of Nb and 20% by weight of V, which is suitable as a storage material for the purposes of the present invention. By choosing other alloys or metals, the temperature of this region can be shifted up or down. Above this temperature region, very little if any hydriding takes place because, at an elevated temperature, the dissociation of the hydrogen from the alloy predominates. If an apparatus according to the invention is to be used in a nuclear power plant, with the temperature and atmospheric composition and their variation in time within the reactor containment that can be expected during an accident, hydrogen-storage materials that are especially suitable are various niobium alloys and alloys such as $CaNi_5$, $LaNi_6$, and $LaNi_{4.7}$, for example. Of these, the latter in particular absorbs 100% of its weight in hydrogen. For these materials the reaction temperature and the hydrogen partial pressure is about 85° C. and 0–2 Mega-Pascals (0–2×10$^6$ newtons/m$^2$), respectively.

The simplest way to convey the heat generated in hydride formation to the catalyst arrangement is to join the hydrogen-storage device to the catalyst arrangement in a mechanical way so as to provide good heat conduction.

The hydrogen-storage material of the hydrogen-storage device can be used in the form of one or more plates, as chips, as granules, or in the form of a sponge. The reaction is more rapid for larger surface areas; therefore, because the choice of form in which the material is used affects the size of the surface area, the reaction rate can be controlled to match the apparatus to a particular usage.

One advantageous way to attach loose hydrogen-storage material such as chips, for example, to a carrier plate coated with catalyst material is to mount one or more caps on portions of the carrier plate or to put on the carrier plate a container made of a lattice-like and thus gas-permeable material, and to pour the hydrogen-storage material into the space formed between such a cap and the carrier plate or into such a container. A container can be fastened to the carrier plate in such a way that good heat conduction exists and an intermediate space remains between most of the bottom of the container and the coated surface of the carrier plate, permitting a direct access of the surrounding gas mixture to the catalyst surface.

Catalyst arrangements are known in which the catalyst material is in a granule-like form and is positioned within a container made of a net-like material in order to achieve a very large catalyst surface area. In such a case the catalyst material and the hydrogen-storage material, likewise provided in granule-like form, can be mixed together and situated within the container.

It is also known that various hydrogen-storage materials have different response times, which are the times that elapse before the process of hydriding commences after the material has been exposed to hydrogen. One additional aspect of the invention exploits this fact by using hydrogen-storage materials with differing response times within a hydrogen-storage device or various hydrogen-storage devices. In this way, an apparatus according to the invention can be used in situations which anticipates releases of hydrogen staggered in time.

Exemplifying embodiments of the invention are explained in more detail below and are illustrated in the drawings.

BRIEF DESCRIPTION OF DRAWINGS

FIG. 1a is a graphical representation of the variation of the temperature over time for catalytically supported oxidation of hydrogen, including functional regions of a hydrogen-storage device.

FIG. 1b is a graphical representation of the variation in hydrogen concentration over time for catalytically supported oxidation of hydrogen.

FIG. 2 is a hypothetical graphical representation of hydrogen storage by formation of a metal hydride where, for three different temperatures as a parameter, the hydrogen pressure is plotted against the ratio of hydrogen to metal.

FIG. 3 is a schematic representation illustrating an embodiment of an apparatus in accordance with the invention, where FIG. 3a shows the view from above and FIG. 3b shows the view from the front.

FIG. 4 is a partial sectional view of a schematic representation illustrating another embodiment of the invention in which only one of the hydrogen-storage elements and the corresponding region of the catalyst arrangement are shown.

FIG. 5 is a schematic representation illustrating an enlarged partial sectional view of yet another embodiment of the invention.

DETAILED DESCRIPTION OF INVENTION

In connection with the exemplifying embodiment shown in FIG. 3, the apparatus consists of a catalyst plate 1 and two hydrogen-storage elements 2 attached to both of its longitudinal sides. Although this is not shown in detail, the catalyst plate 1 consists of a carrier plate made of stainless material coated on both sides with a catalyst material such as those known from the references mentioned above. The hydrogen-storage elements 2 have in both cases a cap 3, shown only as a semi-circle in the section by way of example. The cap 3 has a peripheral flange 4, with which it is bolted down, riveted, or in some other suitable way attached to the catalyst plate 1 so as to conduct heat well. Inside the peripheral flange 4, the cap 3 is made of stainless steel or copper and is netlike or lattice-like. (The cap can also have, as is shown in FIG. 4, for example, an elbowed edge made of the lattice-like material on which are placed a peripheral flange or even just washers for bolting, riveting, or the like). Located within the cap is the hydrogen-storage material 6 which is shown in the figures schematically as a block of material. The mesh size of cap 3 is chosen large enough to ensure that there is free gas access to the space 5 formed between the cap 3 and the catalyst plate 1, but small enough to retain the loose hydrogen-storage material 6.

The hydride formation occurs together with a marked volume expansion. By the end of hydride formation, a crumbling or even a powdering of the hydrogen-storage material takes place. Therefore the space 5 formed between the cap 3 and the catalyst plate 1 should have a volume greater by 30 to 40% than the initial volume of the hydrogen-storage material.

FIG. 4 shows a partial sectional view of another exemplifying embodiment of the invention, which differs from the previously mentioned one in that a filter 7 is provided on the inside wall of cap 3 to protect the hydrogen-storage material 6 from the deposition of aerosols which may be contained in the surrounding atmosphere and could impair the effectiveness of the hydrogen-storage material. This protection is provided to the hydrogen-storage material while it is in a readiness condition and in an operational condition. So called HEPA (High Efficiency Particulate Air) filters are particularly well suited for such use because of their high separation efficiency for aerosols and their extensive permeability for hydrogen and oxygen gases. The filters consist of glass wool with a binder and they are very temperature-stable (up to about 700° C.). A layer of such a filter is attached to the inside wall of the cap 3.

It is known that various hydrogen-storage materials have differing response times before beginning hydride formation, which in some cases are quite long. For example, the response time of Nb–Zr as well as Nb–Ti and Nb–Ta is about 24 hours.

The variation with time of the release of hydrogen from the primary loop into the reactor containment of a nuclear power plant depends on the course of the accident. On the basis of computer simulations it is known that the flow of energy and mass into the reactor containment influences the spatial distribution of the gases and that, in the initial hours after release of hydrogen into the reactor containment, the highest concentrations occur in the immediate vicinity of the site of release. In contrast, long-term hydrogen production and its infiltration into the reactor containment proceeds at a slower pace. Such variation can be taken into account by using various hydrogen-storage materials with differing response times. Thus, a material with a short response time can be provided which commences forming hydrides at the end of the initial large inflow of hydrogen and another hydrogen-storage material with a longer response time can exert its effect later. Despite a comparatively small hydrogen concentration in the later stages of the process, the material with the longer response time can prolong the time of both the catalytic effect and also the hydrogen-storage effect by increasing the catalyst temperature.

If various hydrogen-storage materials with differing response times are chosen, it is advisable to provide at least the bottom of the lattice-like cap with a mesh such that the products of hydride formation whose grain or particle size, as explained above, is smaller than that of the hydrogen-storage material before the reaction, can fall out through the mesh. When a filter is used in accordance with the embodiment shown in FIG. 4, a bottom filter can be chosen which becomes brittle after a certain temperature increase, crumbles, and falls through the wide-meshed bottom of cap 3. This clears the way for the small particles or powder that have been produced thus far in the hydride formation to fall out of cap 3 downwards due to the pull of gravity. In this way a dehydriding of the hydrided hydrogen can be prevented upon a subsequent temperature increase in the catalyst plate.

In an accident situation, large amounts of steam are also released with the hydrogen. A number of metals that are suitable for a hydrogen-storage material in the form of alloy components together with niobium, such as molybdenum and palladium, for example, have a great affinity for reacting with steam to form oxides at the temperatures occurring here. For the hydrogen-storage material with a short response time, such a reaction with steam does not represent a major problem; however, problems do arise with materials that have longer response times and which are exposed correspondingly longer to the steam. Therefore for materials such as metals that are to be alloyed with niobium, it is advantageous to choose those that react only slightly with steam at a temperature of about 300° C. For example, zirconium and titanium fulfill this requirement and, when alloyed with niobium, are distinguished by relatively long response times.

The surface area of the catalyst arrangement needed for a practical apparatus depends on the volume of the space to be protected. The catalyst arrangement and, of course, the hydrogen-storage device, are usually a safety device that is intended to exert its effect only in an accident. Thus, if need be, it must be kept in a state of readiness for many years. For reasons of space within the reactor containment on the one hand and for the protection of the catalyst arrangement on the other, it is known how to keep a catalyst arrangement in a state of readiness in a gas-tight container filled with an inert gas from which it is released only when an accident occurs. This prevents any impairment of the catalytic effect that might arise if the catalyst arrangement is exposed for a long time to an atmosphere containing catalytic poisons, even if these poisons are present only in small concentrations. It is furthermore known how to split up the catalyst arrangement into several individual elements, for example plates, and to store these in a state of readiness as a stack within such a gas-tight container. To keep the volume of such a container from becoming unnecessarily large when the teachings of the invention are applied, it is useful for the hydrogen-storage elements of catalyst plates lying on top of one another within the stack to be positioned in a staggered fashion with respect to each other so that the spacing between any two adjacent catalyst plates in this stack is not larger than the height of extension of a hydrogen-storage element over its catalyst plate.

In the exemplifying embodiment shown, the direct contact between the hydrogen-storage material and the catalyst plate ensures a good thermal transfer of the heat generated in hydride formation to the catalyst plate. In return, however, the surface area of the catalyst plate exposed directly to the surrounding atmosphere is correspondingly reduced. If the hydrogen-storage material is in granular form such as, for example, pellets or chips, the area of the catalyst plate covered by the hydrogen-storage elements is not totally lost for purposes of catalytic action because the hydrogen-storage material is gas-permeable; nevertheless, the catalytic effect of these portions of the surface is reduced because of the impeded gas inflow.

This situation can be remedied by using the hydrogen-storage elements 2' in accordance with the embodiment shown in FIG. 5 which instead of the cap 3 of the embodiments described in the beginning, are in a housing 3', namely are constructed with a floor 3a adjacent to the catalyst plate 1 and attached to the catalyst plate 1 by means of spacers 8 in such a way that this floor is at a certain distance above the catalyst plate 1. If in addition the spacers 8 are provided in the form of separate washers in the region of each riveted joint or threaded joint of the circumferential flange 4, then the surrounding gas mixture has a direct access to that portion of the surface of the catalyst plate 1 lying below this housing, because of the intermediate spaces 9 thereby produced under the circumferential flange 4. Aside from the above-mentioned difference, all of the variations to the previous embodiment of the invention apply equally to that of FIG. 5. The embodiment in FIG. 5 is shown with the filter 7, but it is not restricted to the use of such a filter.

An alternative to the embodiments described above utilizes catalyst arrangements in which the catalyst material is in the form of granules, chips or powder and positioned in a container of net-like material in order to achieve a very large catalyst surface area. Referring to FIGS. 3–5, for example, the apparatus includes a plate 1 and elements 2, with each element containing a mixture 6 of catalyst material in the form of granules, chips or powder, and one or more hydrogen-storage materials in the form of granules, chips or powder.

TABLE 1

| Hydrogen Storage Alloys of Nb | | | |
|---|---|---|---|
| Alloy M | $Nb_{1-x}M_x$ x | Time to 80% completion of reaction sec. | Final composition (atomic ratio) H/M |
| Cr | 0.03 | 140 | 0.84 |
| Cr | 0.05 | 120 | 0.82 |
| Cr | 0.10 | 120 | 0.82 |
| Mn | 0.10 | <100 | 0.85 |
| Fe | 0.01 | 100 | 0.88 |
| Fe | 0.05 | 240 | 1.87 |
| Fe | 0.10 | 150 | 0.80 |
| Co | 0.01 | 120 | 0.88 |
| Co | 0.03 | 100 | 0.87 |
| Co | 0.05 | 100 | 0.84 |
| Mo | 0.05 | ≈ hr | 0.86 |
| Mo | 0.10 | 180 | 0.76 |
| Mo | 0.20 | 150 | 0.65 |
| Mo | 0.30 | 26 | 0.45 |
| Ni | 0.01 | 160 | 0.88 |
| Ni | 0.02 | 60 | 0.89 |
| Ni | 0.03 | 60 | 0.86 |
| Ni | 0.05 | 60 | 0.85 |
| Ni | 0.10 | 180 | 0.74 |
| V | 0.10 | <80 | 0.82 |
| V | 0.50 | <100 | 0.80 |
| V | 0.60 | 160 | 0.64 |
| V | 0.70 | >10 hr | 0.60 |
| Al | 0.10 | 240 | 0.72 |
| Si | 0.02 | <100 | 0.85 |
| Ge | 0.02 | <100 | 0.84 |
| Ga | 0.06 | <80 | 0.74 |
| Zr | 0.01 | >24 hr | |
| Ti | 0.01 | >24 hr | |
| Ta | 0.01 | >24 hr | |

I claim:

1. An apparatus for removing free hydrogen from a gas mixture containing essentially hydrogen, oxygen, and steam, said apparatus comprising:

a catalyst arrangement having a catalyst material for catalytically supporting oxidation of the hydrogen, and a hydrogen-storage device thermally coupled to the catalyst arrangement, said device comprising a container made of a net-like material containing one or more hydrogen-storage materials in the form of plates, granules, chips or a sponge, wherein at temperatures below an effective reaction temperature of the catalyst arrangement said device binds hydrogen by hydride formation and generates heat.

2. An apparatus according to claim 1, wherein the hydrogen-storage device is mechanically coupled to the catalyst arrangement.

3. An apparatus according to claim 2, wherein the catalyst arrangement comprises a carder plate coated with the catalyst material.

4. An apparatus according to claim 3, wherein the container made of a net-like material abuts the carrier plate, the container and the carrier plate thereby enclosing the one or more hydrogen-storage materials.

5. An apparatus according to claim 1, wherein the container made of a net-like material encloses the one or more hydrogen-storage materials.

6. An apparatus according to claim 1, wherein the net-like container contains a mixture of the catalyst material and the one or more hydrogen-storage materials, the catalyst material being in the form of granules, chips or powder.

7. An apparatus according to claim 1, 3 or 6, wherein the hydrogen-storage device comprises at least two hydrogen-storage materials each having a different response time, which response time is the time required by a respective hydrogen-storage material to begin the hydride formation after reaching a temperature needed for the hydride formation, wherein the hydrogen-storage material having the shortest response time disintegrates into a substance of relatively fine grain size during the hydride formation, and wherein the portion of the net-like material constituting the bottom of the container has a mesh size that is larger than the relatively fine grain size.

8. An apparatus according to claim 1, 3 or 6, wherein the hydrogen-storage device comprises at least two hydrogen-storage materials each having a different response time, which response time is the time required by a respective hydrogen-storage material to begin the hydride formation after reaching a temperature needed for the hydride formation.

9. An apparatus according to claim 8, wherein the hydrogen-storage materials are niobium alloys.

10. An apparatus according to claim 9, wherein the hydrogen-storage materials are alloys of niobium with zirconium or titanium.

11. An apparatus according to any one of claims 1 through 6, wherein the hydrogen-storage materials are niobium alloys.

12. An apparatus according to claim 11, wherein the hydrogen-storage materials are alloys of niobium with zirconium or titanium.

13. An apparatus for removing free hydrogen from a gas mixture containing essentially hydrogen, oxygen, and steam, said apparatus comprising:

a catalyst material in the form of granules, chips or powder for catalytically supporting oxidation of the hydrogen, a hydrogen-storage material in the form of granules, chips or powder, which at temperatures below an effective reaction temperature of the catalyst material, binds hydrogen by hydride formation and generates heat, and a container made of a net-like material containing a mixture of the catalyst material and the hydrogen-storage material.

14. An apparatus for removing free hydrogen from a gas mixture containing essentially hydrogen, oxygen, and steam, said apparatus comprising:

a plate coated with a hydrogen-oxidizing catalyst material, and a mesh container coupled to the plate and containing a hydrogen-storage material.

15. An apparatus according to claim 14 wherein the hydrogen-storage material is in the form of plates, granules, chips or a sponge.

16. An apparatus according to claim 14 wherein the hydrogen-storage material binds hydrogen by hydride formation at temperatures below an effective reaction temperature of the catalyst material.

* * * * *